United States Patent [19]
Gehrmann

[11] Patent Number: 5,436,671
[45] Date of Patent: Jul. 25, 1995

[54] METHOD OF SEPARATING A FOREGROUND PICTURE SIGNAL FROM A MIXED PICTURE SIGNAL, USING GAMMA CORRECTION, AND ARRANGEMENT FOR PERFORMING SAID METHOD

[75] Inventor: Rainer Gehrmann, Alsbach-Hähnlein, Germany

[73] Assignee: U.S. Philips Corporation, New York, N.Y.

[21] Appl. No.: 190,430

[22] Filed: Feb. 2, 1994

[30] Foreign Application Priority Data

Feb. 5, 1993 [DE] Germany .......... 43 03 347.4
Jan. 12, 1994 [DE] Germany .......... 44 00 599.7

[51] Int. Cl.⁶ .................................. H04N 9/75
[52] U.S. Cl. ........................... 348/587; 348/592
[58] Field of Search .......... 348/578, 592, 587, 590, 348/591, 599, 597, 595; 358/22 CK; H04N 9/74, 9/75, 5/272, 5/275

[56] References Cited

U.S. PATENT DOCUMENTS 5,301,016 4/1994 Gehrmann .......... 348/586

OTHER PUBLICATIONS

Devereaux, "Television Animation Store: Digital Chroma-Key and Mixer Units", Research Report 1984/16 of the British Broadcasting Corporation Engineering Division.

Primary Examiner—James J. Groody
Assistant Examiner—Sherrie Hsia
Attorney, Agent, or Firm—Edward W. Goodman

[57] ABSTRACT

In a method of separating a foreground picture signal FG from a mixed picture signal MG having a key color KC and transition colors to this key color in key regions, the components of the key color and the transition colors are vectorially subtracted from the mixed picture signal in dependence upon a control signal k which, with a continuous variation, assumes values of between 1 in the region of the key color KC and O at mixed boundaries. Color errors due to a gamma pre-correction are obviated in that the vectorial subtraction is performed in accordance with the equation $FG=MG-k*KC(f)$, in which $KC(f)$ is chosen in dependence upon the color intensity as far as its angle in the $C_b/C_r$ color plane is concerned.

12 Claims, 2 Drawing Sheets

METHOD OF SEPARATING A FOREGROUND PICTURE SIGNAL FROM A MIXED PICTURE SIGNAL, USING GAMMA CORRECTION, AND ARRANGEMENT FOR PERFORMING SAID METHOD

BACKGROUND OF THE INVENTION

1. Field of the Invention

The invention relates to a method of separating a foreground picture signal FG from a mixed picture signal MG having a key color KC and transition colors to this key color in key regions, the components of the key color and the transition colors being vectorially subtracted from the mixed picture signal in dependence upon a control signal k which, with a continuous variation, assumes values of between 1 in the region of the key color KC and 0 at mixing boundaries.

2. Description of the Related Art

In such methods the component of the key color KC which is assumed to be present in the mixed picture signal is vectorially subtracted from the mixed picture signal. This is effected in dependence upon a control signal which continuously assumes values of between 1 (full subtraction of the key color) and 0 (no subtraction of the key color). The key color component can then also be subtracted from transition colors which have only a smaller key color component (with a reduced color intensity).

The term "color intensity" is herein understood to be a distinctive characteristic feature of such colors in the component color space, which colors have in common that all of them are situated on the same straight line, starting at achromatic locus/black. Thus, hue, chromaticity and also color saturation are common because the chrominance-to-luminance ratio always remains equal.

The term "color intensity" will hereinafter frequently be used instead of two-dimensional projection in the $C_b/C_r$ plane, i.e. of the chroma, because the question of whether the luminance varies or does not vary is left open by the term "chroma variation".

However, the vectorial subtraction of the key color involves the problem that in many picture signals there is no linear relation between the luminance signal of the camera input and the chrominance signal. A gamma pre-correction is often performed which, at the display end, is corrected by the gradation of the phosphor on the display screen of a monitor. However, errors will occur if the foreground picture signal is to be separated from the mixed picture signal after the gamma pre-correction or before a gamma correction.

The cause of the deviations from the linear behavior is not the gamma correction itself, as may easily be assumed at first, but the type of gamma correction. The problem is posed by the gamma characteristic curves of the R, G, B camera signals which deviate from an ideal exponential curve.

When coding to form component signals, signals of the three channels are combined at differently large amplitudes and thus also at different gradients. Consequently, the gradient is dependent on the amplitude. However, a purely exponential variation is an exception. Though its variation is curved, its exponent (slope) is constant throughout the amplitude.

To eliminate such problems, it is known from the thesis entitled "Television Animation Store: Digital Chroma Key and Mixer Units" by V. G. Devereux in Research Report 1984/16 of the British Broadcasting Corporation Engineering Division, to define a narrow angular range including all feasible divergences of the key color and of the transition colors. After vectorial subtraction of the components of the key color and the transition colors, all remaining colors are set at their achromatic locus. This method has the drawback that it is limited to small divergention angular ranges of the key color and of the transition colors in the $C_b/C_r$ color plane. Moreover, weak color nuances of a transparent object which also comprises components of the key color or of transition colors are lost.

SUMMARY OF THE INVENTION

It is an object of the invention to enhance the method described in the opening paragraph to such an extent that it also provides the possibility of extracting the key color and the transition colors in the case of a non-linear relationship between luminance and color in the mixed picture signal without varying other color nuances in the mixed picture signal or generating new color nuances.

In a first embodiment according to the invention, this object is solved in that the vectorial subtraction is performed in accordance with the equation FG=MG-k*KC(f), in which KC(f) is chosen in dependence upon the color intensity as far as its angle in the $C_b/C_r$ color plane is concerned.

A component of the key color or the transition color is vectorially subtracted from the mixed picture signal MG. The magnitude of this subtraction is controlled by the value k of the control signal. This control signal assumes values of between 1 and 0 with a continuous variation. The value 1 is reached in the range of full intensity of the key color KC. The value 0 is reached at so-called mixing boundaries, as far as which transition colors components are vectorially subtracted from the mixed picture signal. However, the equation FG=MG-k*KC(f) no longer starts from a fixed color location KC of the key color. Particularly, transition colors between the key color KC and the achromatic locus in the $C_b/C_r$ color plane do not necessarily show the same angle as the key color KC. Non-linearities of the mixed picture signal, more specifically in the relation between the chrominance signal in this picture signal and the luminance signal of the camera input, may result in a curved variation of the transition colors in the $C_b/C_r$ color plane. In other words, this means that transition colors and components having a low intensity of the key color KC in the $C_b/C_r$ color plane have a different color angle than the key color KC at full color intensity.

Consequently, the value KC(f) is chosen in dependence upon the color intensity of the component of the key color or a transition color. For a pixel which is present in the $C_b/C_r$ color plane between the key color KC at full color intensity and the achromatic locus, a value KC(f) is chosen in dependence upon its color intensity, i.e. in dependence upon its distance to the achromatic locus in the $C_b/C_r$ color plane, which value is chosen to be such that it takes the non-linear relation between the luminance and chrominance signal components present in the mixed picture signal into account.

It is thereby achieved that also a location having transition colors at full color intensity with a different color angle in the $C_b/C_r$ color plane than that of the key color KC, is vectorially subtracted with exactly the correct amount and the correct color angle of the key color or the transition color KC (f). In contrast to the state-of-the-art method, there is no color distortion in the foreground picture signal.

In accordance with a second embodiment of the invention, the vectorial subtraction is performed in accordance with the equation FG=MG-k*KC(f), in which KC(f) is chosen in dependence upon the color intensity as far as its three components Y, $C_r$, $C_b$ are concerned.

A similar dependence as that between the color intensity and the horizontal chromaticity angle (hue) can also be found between the color intensity and the vertical chromaticity angle, i.e. the luminance value. The effect is that the color saturation no longer remains constant at intensity variations.

The cause and qualitative variation are equal or similar as those already represented in the horizontal $C_r/C_b$ plane. The solution shown can thus be further extended to the luminance component of KC. The vertical angle, or the luminance value Y, should also be determined via the color intensity and the value k of the control signal, respectively.

For a further embodiment of the invention, KC(f) is chosen in dependence upon the value k of the control signal. Due to the above-described variation of the values of the control signal in dependence upon the distance from the key color and the mixing boundaries, the control signal is correspondingly dependent on the value of the color intensity of a point between the key color and the achromatic locus in the $C_b/C_r$ color plane. The value KC(f) can be chosen also in dependence upon the value k of the control signal, which also necessitates a dependence upon the color intensity in the case of the above-described choice of the control signal. The choice of the dependence of the value KC(f) on the value k of the control signal may, however, be simpler in its realisation than a direct dependence on the color intensity.

In principle, the variation of the function KC(f) in the $C_b/C_r$ color plane and in the Y/Chr plane may be chosen arbitrarily. In accordance with a further embodiment of the invention, this may be advantageously realised in that KC(f) is defined as an exponential curve extending in the $C_b/C_r$ color plane. A parameter for selecting the curve variations may suffice in this case.

An embodiment of an arrangement for performing the method according to the invention is characterized in that the values KC(f) dependent on the color intensity and/or on the control signal k are stored in a memory table and in that for separating the foreground picture signal FG from the mixed picture signal MG in dependence upon the color intensity and/or the value k of the control signal, the corresponding values KC(f) are read from the memory and are used in the vectorial subtraction.

The values KC(f) which are stored in the memory table can thus be simply adapted to varying conditions.

These and other aspects of the invention will be apparent from and elucidated with reference to the embodiments described hereinafter.

DESCRIPTION OF THE PREFERRED EMBODIMENT

Figure 1:
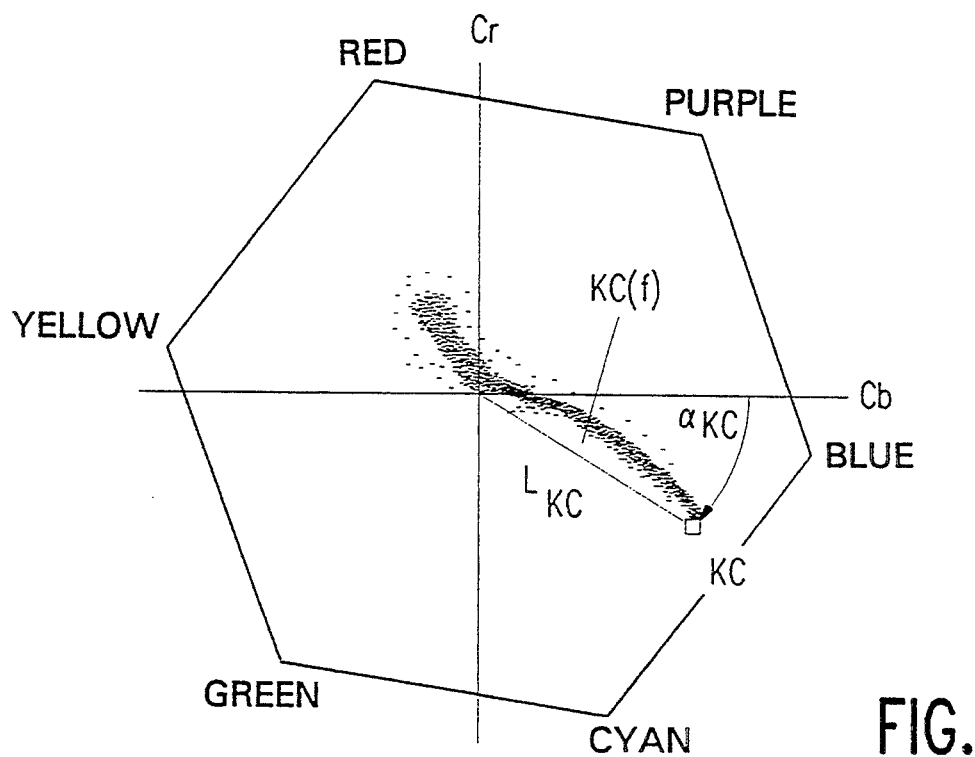
FIG. 1 shows diagrammatically some color locations in the $C_b/C_r$ plane occurring in a mixed picture signal.

FIG. 1 shows diagrammatically the known $C_b/C_r$ color plane in which $C_b$ and $C_r$ denote the color difference signals B-Y and R-Y, respectively.

In the $C_b/C_r$ color plane shown in FIG. 1, the color locations which occur, for example, in a field of a mixed picture signal MG are illustrated by way of dark shaded areas.

FIG. 1 further shows a color location KC which corresponds to the key color at full color intensity. Furthermore, accumulations of color locations in the achromatic region with a tendency towards red or yellow can be recognized. These pixels are not influenced by the key color or by transition colors and are associated with the foreground picture signal FG to be separated from the mixed picture signal.

However, in the transition range between the key color KC at full color intensity and the achromatic locus, a series of pixels can be recognized which represent transition colors between the key color and the actual foreground picture contents to be separated as a foreground picture signal FG. These pixels, which are denoted by KC(f) in the Figure, do not, however, extend on a straight line between the color location KC and the achromatic locus in the $C_b/C_r$ color plane. The cause of this curved variation of the transition colors KC(f) may be, for example, a camera gamma pre-correction in which a non-linear relation between the luminance signal and the chrominance signal is established deliberately. This is done, for example, for the purpose of adaptation to an inverse gamma characteristic curve of a picture tube in a display monitor in which it is cancelled (automatically). However, if the foreground picture signal FG is to be separated from the mixed picture signal MG before the gamma correction is cancelled at the display end, color errors may occur in the case of a simple vectorial subtraction of components of the key color KC from the transition colors.

If, for example, a subtraction of a component KC (f) of the same vectorial direction as for the key color KC at full color intensity were carried out for a pixel which is situated on the curve approximately between the key color KC at full color intensity and the achromatic locus in the $C_b/C_r$ color plane, the color location of this pixel would not be reset at the achromatic locus of the $C_b/C_r$ color plane, but at a color location somewhere on the $C_r$ axis, i.e. with a tendency towards red. Thus, a blue component would be convened into a red component. This color error is obviated by the method according to the invention.

According to the invention, this is achieved in that the vectorial subtraction of the component of the key color or the transition color is performed in such a way that the vectorially subtracted component of the key color or of the transition color is chosen in dependence upon the color intensity as far as its angle in the $C_b/C_r$ color plane is concerned. For example, a different angle of the key color KC(f) would be assumed for the above-assumed pixel situated on the curve approximately between the key color KC at full color intensity and the achromatic locus in the $C_b/C_r$ color plane.

To perform this method, the different values KC(f) are chosen to be such that they correspond to the curved variation of the transition colors in FIG. 1. Thus, also for these transition colors, which have different angles in the $C_b/C_r$ color plane, a vectorial subtraction of their components is performed in pixels which reset the key color component at achromatic locus and do not regenerate other color components.

The color intensity or the chroma of the key color component can be used as a measure of the control value f of KC(f). However, it is alteratively possible to use the value k of the control signal for the choice of the value KC(f). If in the equation FG = MG-k*KC(f) the control signal k assumes values with a continuous variation between 1 (in the region of the key color KC) and 0 (at mixing boundaries), the dependence of the color intensity is also automatically given when choosing the value KC(f) in dependence upon the value k of the control signal.

Figure 2:
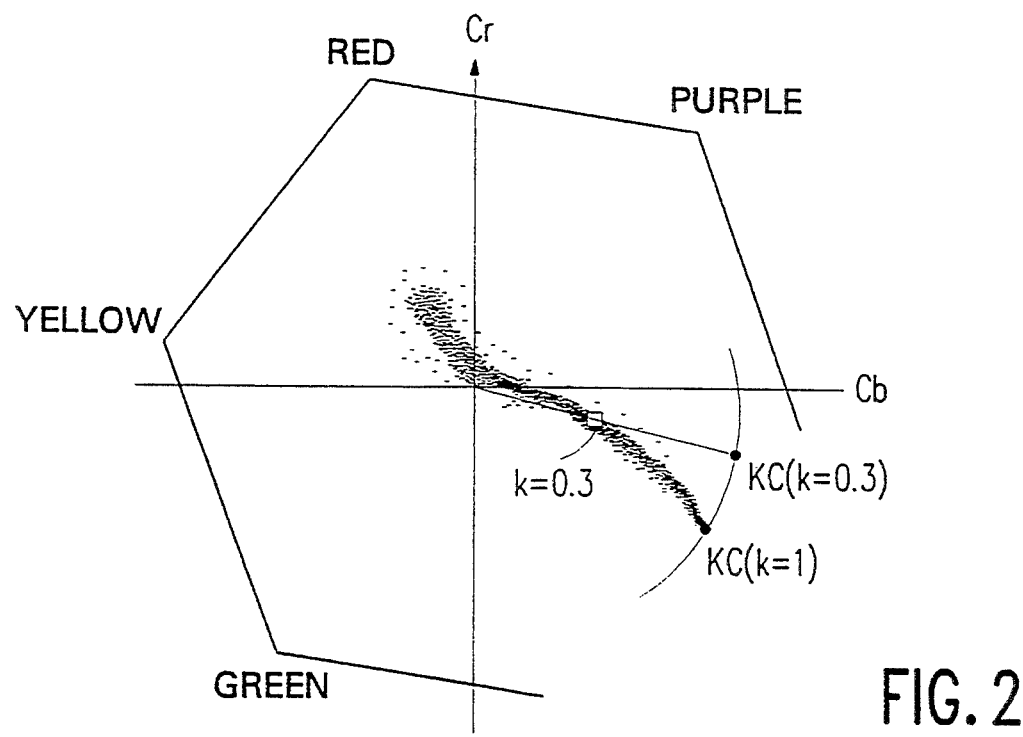
FIG. 2 is similar to FIG. 1, with a selection of the value KC(f) in dependence upon a control signal k.

FIG. 2 shows diagrammatically two values, viz. the value KC(k=1) for the value of the key color KC at full color intensity and a value KC(k=0.3) for a value of a transition color at a clearly weaker color intensity. FIG. 2 shows that for the value KC(k=0.3), a color angle in the $C_b/C_r$ color plane is given which is clearly different than for the value KC(k=1).

This also applies to other pixels of the mixed picture signal on the curve between the key color KC at full color intensity and, for example the achromatic locus of the $C_b/C_r$ color plane where the control signal k reaches the value 0.

Figure 3:
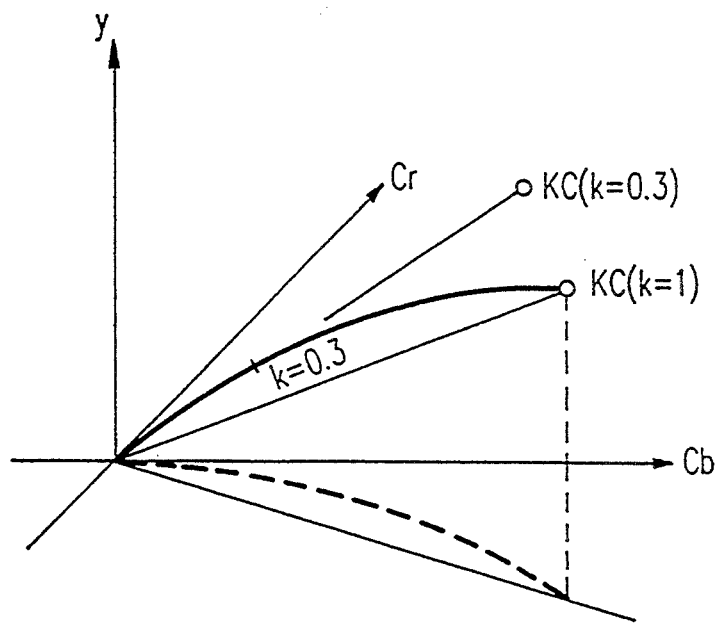
FIG. 3 is a three-dimensional representation in the $Y/C_b/C_r$ color space, similar to FIG. 2, with a selection of the value KC(f) in dependence upon a control signal k.

FIG. 3 perspectively shows the three-dimensional component color space. The luminance component has been added. In addition to the already known (projected) variation in the $C_r/C_b$ plane, the Figure shows that also the ratio between chrominance and luminance (saturation) does not remain constant when the key color intensity is varied. In the representation shown the computed linear, proportional value is generally below the actual value. Its consequence is that, for example, too little luminance is extracted from a mixed picture signal at a value of k=0.3.

However, if the variable KC(f) also implies an appropriate increase of luminance, this effect is compensated for. It is then ensured that also key color values of low intensity (shades) are correctly set at black. FIG. 3 again shows the key color KC(k=1) at 100% intensity as well as the changed key color KC(k=0.3) corresponding to an intensity of 30%. This changed key color does not only have a changed hue in the $C_b/C_r$ plane, but also a changed luminance value Y.

Generally, the key color KC should then become variable in all three components and become a function of the color intensity and the control signal k, respectively:

$$KC(f) = KC_{Cb}(f), KC_{Cr}(f), KC_y(f).$$

Figure 4:
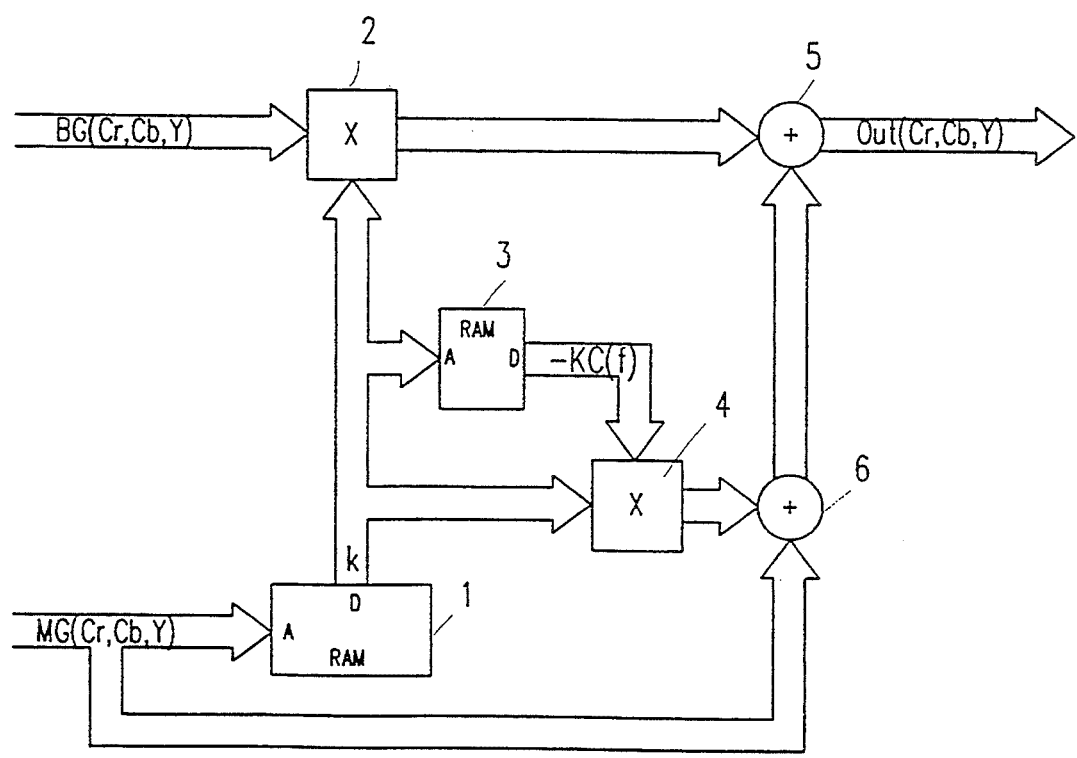
FIG. 4 shows an arrangement for performing the method with an additional insertion of a background picture signal into the mixed picture signal key regions extracted from the foreground picture signal.

FIG. 4 shows a block diagram of an arrangement with which both the method according to the invention can be performed, and a background picture signal can be combined with the foreground picture signal. The background picture signal is combined with the foreground picture signal in the regions where the key color KC and the transition colors have been extracted. In other words, the key region of the mixed picture signal in the foreground picture signal is replaced by the background signal.

The input of the arrangement receives the mixed picture signal MG with the components $C_r$, $C_b$ and Y. $C_r$ and $C_b$ denote the two color difference signals and Y denotes the luminance signal.

The mixed picture signal MG is applied to a first memory 1 in which a control signal k is generated in dependence upon the color location of the pixels of the mixed picture signal. This control signal k may be generated, for example, in such a way that it assumes a continuous variation, reaching the value of about 1 in the region of the key color KC and of about 0 in the achromatic region of the $C_b/C_r$ color plane. The control signal k is applied to a multiplier 2, a second memory 3 and a second multiplier 4.

In the second memory 3 a value KC(f) which is applied with a negative sign to the multiplier 4 is selected in dependence upon the value k of the control signal and hence indirectly also in dependence upon the value of the color intensity of the mixed picture signal MG. In this multiplier the value of KC(f) is multiplied by the value k of the control signal. This product is added to the value of the mixed picture signal MG in an adder 6. The three components $C_b$, $C_r$ and Y are added individually.

Like the control signal k, a background picture signal is applied to the multiplier 2. The output signal of the multiplier 2 is added in an adder 5 to the output signal of the adder 6. The output signal of the adder 6 represents the signal in which the component k*KC(f) was vectorially subtracted from the mixed picture signal MG. Also in dependence upon the control signal k, the background signal BG was inserted into those regions of the foreground picture signal from which the key color and transition colors were removed.

The arrangement shown in FIG. 4 operates in accordance with the equation OUT=MG-k*KC(f)+k*BG.

I claim:

1. A method of separating a foreground picture signal FG from a mixed picture signal MG having a key color KC and transition colors to the key color in key regions, components of the key color and the transition colors being vectorially subtracted from the mixed picture signal in dependence upon a control signal k which, with a continuous variation, has values between 1 in the region of the key color KC and 0 at mixed boundaries, characterized in that the vectorial subtraction is performed in accordance with the equation FG=MG-k,KC(f), in which KC(f) is chosen in dependence upon color intensity as far as an angle of KC(f) in a $C_b/C_r$ color plane is concerned.

2. A method of separating a foreground picture signal FG from a mixed picture signal MG having a key color KC and transition colors to the key color in key regions, components of the key color and the transition colors being vectorially subtracted from the mixed picture signal in dependence upon a control signal k which, with a continuous variation, has values between 1 in the region of the key color KC and 0 at mixed boundaries, characterized in that the vectorial subtraction is performed in accordance with the equation FG=MG-k*KC(f), in which KC(f) is chosen in dependence upon color intensity as far as three components Y, $C_r$, $C_b$ of KC(f) are concerned.

3. A method as claimed in claim 1, characterized in that KC(f) is chosen in dependence upon the value k of the control signal.

4. A method as claimed in claim 1, characterized in that KC(f) is defined as an exponential curve extending in the $C_b/C_r$ color plane.

5. An arrangement for for separating a foreground picture signal FG from a mixed picture signal MG having a key color KC and transition colors to the key color in key regions, said arrangement comprising an input for receiving the mixed picture signal MG; means coupled to said input for generating a control signal k in dependence on color locations of pixels of the mixed picture signal MG; a first multiplier having a first input for receiving said control signal k and a second input for receiving a background signal BG; means for generating a value KC(f) in dependence on a value of the control signal k; a second multiplier having a first input for receiving the control signal k and a second input for receiving a value −KC(f) based on the value KC(f); a first adder having a first input coupled to an output of said second multiplier and a second input coupled to the input of said arrangement; and a second adder having a first input coupled to an output of said first multiplier and a second input coupled to an output of said first adder, an output of said second adder carrying the foreground signal FG separated from the mixed picture signal MG in accordance with the relationship FG=MG-k*KC(f)+k*BG, where KC(f) is determined in dependence upon color intensity as far as an angle of KC(f) in a $C_b/C_r$ color plane is concerned, characterized in that the values of KC(f) are stored in a table contained in a memory addressed by the control signal k, and in that for separating the foreground picture signal FG from the mixed picture signal MG, the corresponding values of KC(f) are read from the memory and used in a vectorial subtraction performed in the first adder.

6. A method as claimed in claim 2, characterized in that KC(f) is chosen in dependence upon the value k of the control signal.

7. A method as claimed in claim 2, characterized in that KC(f) is defined as an exponential curve extending in a $C_b/C_r$ color plane.

8. A method as claimed in claim 3, characterized in that KC(f) is defined as an exponential curve extending in the $C_b/C_r$ color plane.

9. A method as claimed in claim 6, characterized in that KC(f) is defined as an exponential curve extending in a $C_b/C_r$ color plane.

10. An arrangement for for separating a foreground picture signal FG from a mixed picture signal MG having a key color KC and transition colors to the key color in key regions, said arrangement comprising an input for receiving the mixed picture signal MG; means coupled to said input for generating a control signal k in dependence on color locations of pixels of the mixed picture signal MG; a first multiplier having a first input for receiving said control signal k and a second input for receiving a background signal BG; means for generating a value KC(f) in dependence on a value of the control signal k; a second multiplier having a first input for receiving the control signal k and a second input for receiving a value −KC(f) based on the value KC(f); a first adder having a first input coupled to an output of said second multiplier and a second input coupled to the input of said arrangement; and a second adder having a first input coupled to an output of said first multiplier and a second input coupled to an output of said first adder, an output of said second adder carrying the foreground signal FG separated from the mixed picture signal MG in accordance with the relationship FG=MG-k*KC(f)+k*BG, where KC(f) is determined in dependence upon color intensity as far as three color components Y, $C_r$, $C_b$ of KC(f) are concerned, characterized in that the values of KC(f) are stored in a table contained in a memory addressed by the control signal K, and in that for separating the foreground picture signal FG from the mixed picture signal MG, the corresponding values of KC(f) are read from the memory and used in a vectorial subtraction performed by the first adder.

11. An arrangement as claimed in claim 5, characterized in that KC(f) is defined as an exponential curve extending in the $C_b/C_r$ color plane.

12. An arrangement as claimed in claim 10, characterized in that KC(f) is defined as an exponential curve extending in a $C_b/C_r$ color plane.

* * * * *